United States Patent
Shoji et al.

(10) Patent No.: US 7,043,201 B2
(45) Date of Patent: May 9, 2006

(54) TWO-WAY RADIO COMMUNICATION SYSTEM AND TWO-WAY RADIO COMMUNICATION METHOD

(75) Inventors: Yozo Shoji, Tokyo (JP); Kiyoshi Hamaguchi, Tokyo (JP); Hiroyo Ogawa, Tokyo (JP)

(73) Assignee: Communications Research Laboratory, Independent Administrative Institution, Koganei (JP)

( * ) Notice: Subject to any disclaimer, the term of this patent is extended or adjusted under 35 U.S.C. 154(b) by 788 days.

(21) Appl. No.: 09/885,113

(22) Filed: Jun. 21, 2001

(65) Prior Publication Data

US 2001/0055953 A1    Dec. 27, 2001

(30) Foreign Application Priority Data

Jun. 23, 2000    (JP)    ............................. 2000-190216

(51) Int. Cl.
*H04B 7/14*    (2006.01)

(52) U.S. Cl. ........................... 455/17; 455/11.1; 455/84
(58) Field of Classification Search .................. 455/84, 455/11.1, 17
See application file for complete search history.

(56) References Cited

U.S. PATENT DOCUMENTS

| 3,733,438 | A | * | 5/1973 | Haley et al. ................. 370/482 |
| 4,483,000 | A | * | 11/1984 | Yamamoto et al. ......... 370/347 |
| 4,761,821 | A | | 8/1988 | Mawhinney et al. |
| 5,890,051 | A | * | 3/1999 | Schlang et al. ............... 455/76 |
| 6,112,069 | A | * | 8/2000 | Na .............................. 455/296 |

FOREIGN PATENT DOCUMENTS

JP    2001-53640    2/2001

\* cited by examiner

*Primary Examiner*—Bing Q. Bui
*Assistant Examiner*—Rasha S. Al-Aubaidi
(74) *Attorney, Agent, or Firm*—Oblon, Spivak, McClelland, Maier & Neustadt, P.C.

(57) ABSTRACT

Only a first radio station is equipped with a local oscillation signal source. A signal transmitted to a second radio station includes local oscilaation signal components used to up-convert a modulated intermediate frequency band signal in addition to intermediate frequency band signal components. The second radio station that receives the signal from the first radio station extracts and regenerate the local oscillation signal used at the first radio station using a local oscillation signal regenerator. The extracted and regenerated local oscillation signal is used to down-convert modulated radio signal components to the intermediate frequency band and simultaneously up-convert to the radio frequency band the modulated intermediate frequency band signal to be transmitted to the first radio station.

2 Claims, 3 Drawing Sheets

TWO-WAY RADIO COMMUNICATION SYSTEM AND TWO-WAY RADIO COMMUNICATION METHOD

BACKGROUND OF THE INVENTION

1. Field of the Invention

This invention relates to a two-way radio communication system and a two-way radio communication method. More specifically, in radio communication systems using the SHF and higher frequency bands such as, for example, radio LANs, radio home links, radio video transmission systems, radio road-to-vehicle communication systems, inter-vehicle communication systems and other such systems utilizing millimeter waves, the present invention relates to a two-way radio communication system and a two-way radio communication method for high-quality, high-speed transmission of digital signals and analog signals.

2. Description of the Prior Art

In JP-A 2001-53640 the present inventors proposed a radio communication system that employs self-heterodyne detection. In this system, part of a local oscillation signal used by the transmitter to frequency-convert a modulated intermediate frequency band signal to a radio frequency band is transmitted by radio simultaneously with the transmission radio frequency, and the receiver then frequency-converts the received radio signal to the modulated intermediate frequency band signal by generating a multiplication product of these two components. However, the above proposal did not provide specific technical details about how to realize the system.

An object of the present invention is to provide a two-way radio communication system and a two-way radio communication method for enabling high-quality, two-way radio communication without the use of a high-quality local oscillation signal.

SUMMARY OF THE INVENTION

For achieving this object, this invention provides a two-way radio communication system for two-way communication between first and second radio stations, the two-way radio communication system comprising a first radio station equipped with a signal modulator for generating a modulated signal in an intermediate frequency band that is lower than a radio frequency, a modulated transmission signal generator that produces a modulated radio transmission signal by using a local oscillation signal to up-convert the modulated signal to a radio frequency band, a transmitter that transmits the local oscillation signal used by the modulated transmission signal generator together with the modulated radio transmission signal as a radio signal; and a receiver that receives a radio signal from a second radio station and down-converts the received signal to a modulated frequency band by using the local oscillation signal utilized for up-conversion by the modulated transmission signal generator, a second radio station equipped with a local oscillation signal regenerator for extracting and regenerating just a local oscillation component from among signal components received from the first radio station, a receiver that uses a local oscillation signal regenerated by the local oscillation signal regenerator to down-convert a received modulated radio signal to an intermediate frequency band, a signal modulator for producing a modulated signal in an intermediate frequency band that is lower than a radio frequency, and a transmitter that uses the local oscillation signal regenerated by the local oscillation signal regenerator to up-convert to a radio frequency band a modulated signal produced by the signal modulator.

The invention also includes a two-way radio communication system for two-way communication between first and second radio stations, the two-way radio communication system comprising first and second radio stations, each of which radio stations are equipped with a signal modulator for generating a modulated signal in an intermediate frequency band that is lower than a radio frequency, a modulated transmission signal generator that produces a modulated radio transmission signal by using a local oscillation signal to up-convert the modulated signal to a radio frequency band, a transmitter that transmits the local oscillation signal used by the modulated transmission signal generator together with the modulated radio transmission signal as a radio signal, and a receiver that receives a radio signal from the other radio station and down-converts the received signal to a modulated intermediate frequency band by generating a multiplication component of a modulated radio signal component and local oscillation signal component received from the other radio station.

The invention also includes a two-way radio communication system for two-way communication between first and second radio stations, the two-way radio communication system comprising a first radio station equipped with a signal modulator for generating a modulated signal in an intermediate frequency band that is lower than a radio frequency, a modulated radio signal generator that uses a local oscillation signal to up-convert the modulated signal to a radio frequency band, a transmitter that from among sideband signals generated during conversion of a modulated intermediate frequency band signal to the radio frequency band by the modulated radio signal generator, selects an upper-side-band signal (USB signal) as a radio signal and transmits the selected radio signal together with the local oscillation signal utilized by the modulated radio signal generator, and a receiver that receives a radio signal from the second radio station and down-converts the received signal to a modulated intermediate frequency band by generating a multiplication component of a modulated radio signal component and local oscillation signal component received from the other radio station, a second radio station equipped with a signal modulator for generating a modulated signal in an intermediate frequency band that is lower than a radio frequency, a modulated radio signal generator that uses a local oscillation signal to up-convert the modulated signal to a radio frequency band, a transmitter that from among sideband signals generated during conversion of a modulated intermediate frequency band signal to the radio frequency band by the modulated radio signal generator, selects a lower-side-band signal (LSB signal) as a radio signal and transmits the selected radio signal together with the local oscillation signal utilized by the modulated radio signal generator, and a receiver that receives a radio signal from the first radio station and down-converts the received signal to a modulated intermediate frequency band by generating a multiplication component of a modulated radio signal component and local oscillation signal component received from the first radio station.

The invention also includes a two-way radio communication method for conducting two-way communication between first and second radio stations, the two-way radio communication method comprising a first radio station that transmits a radio signal to a second radio station by generating a modulated signal in an intermediate frequency band that is lower than a radio frequency, producing a modulated radio transmission signal, using a local oscillation signal to up-convert the modulated signal to a radio frequency band and transmitting the local oscillation signal used by the modulated radio transmission signal with the modulated radio transmission signal as a radio signal, and when receiving a radio signal from the second radio station, down-converts the received signal to a modulated frequency band by using the local oscillation signal utilized for up-conversion, and a second radio station that extracts and regenerates local oscillation components from among signal components received from the first radio station, uses a local oscillation signal thus regenerated to down-convert a received modulated radio signal to an intermediate frequency band and, when transmitting a radio signal to the first radio station, produces a modulated signal in an intermediate frequency band that is lower than a radio frequency, and uses the regenerated local oscillation signal to up-convert to a radio frequency band a modulated signal produced by the signal modulator.

The invention also includes a two-way radio communication method for conducting two-way communication between first and second radio stations, the two-way radio communication method comprising first and second radio stations that in a case of mutual transmission of radio signals between the stations, each generate a modulated signal in an intermediate frequency band that is lower than a radio frequency, produce a modulated radio transmission signal, use a local oscillation signal to up-convert the modulated signal to a radio frequency band and transmit the local oscillation signal used by the modulated radio transmission signal with the modulated radio transmission signal as a radio signal, and when a radio signal is received from the other radio station, down-convert the received signal to a modulated intermediate frequency band by generating a multiplication component of a received modulated radio signal component and local oscillation signal component.

The above object is also attained by a two-way radio communication method for conducting two-way communication between first and second radio stations, the two-way radio communication method comprising transmission by a first radio station of a radio signal to a second radio station by generating a modulated signal in an intermediate frequency band that is lower than a radio frequency, producing a modulated radio transmission signal, using a local oscillation signal to up-convert the modulated signal to a radio frequency band and transmitting the local oscillation signal used by the modulated radio transmission signal with the modulated radio transmission signal as a radio signal; and when receiving a radio signal from the second radio station, down-converts the received signal to a modulated frequency band by using the local oscillation signal utilized for up-conversion and, of sideband signals generated during conversion of a modulated intermediate frequency band signal to the radio frequency band by the modulated radio signal generator, selects an upper-side-band radio signal and transmits the selected radio signal together with the local oscillation signal, and when a radio signal is received from the other radio station, down-converts the received signal to a modulated intermediate frequency band by generating a multiplication component of a received modulated radio signal component and local oscillation signal component; and transmission to the first radio station by a second radio station, generating a modulated signal in an intermediate frequency band that is lower than a radio frequency, producing a modulated radio transmission signal, using a local oscillation signal to up-convert the modulated signal to a radio frequency band and, of sideband signals generated during conversion of a modulated intermediate frequency band signal to the radio frequency band by the modulated radio signal generator, selecting a lower-side-band radio signal and transmitting the selected radio signal together with the local oscillation signal, and when a radio signal is received from the first radio station, down-converting the received signal to a modulated intermediate frequency band by generating a multiplication component of a received modulated radio signal component and local oscillation signal component.

The two-way radio communication system and method described above provide high-quality two-way radio transmission, since signal phase noise and frequency offset in the local oscillation signal can be canceled out. Moreover, since there is no need to use a high-quality local oscillator, two-way radio communication can be achieved at low cost.

The above and other objects and features of the invention will become apparent from the following description made with reference to the drawings.

DESCRIPTION OF THE PREFERRED EMBODIMENTS

Figure 1:
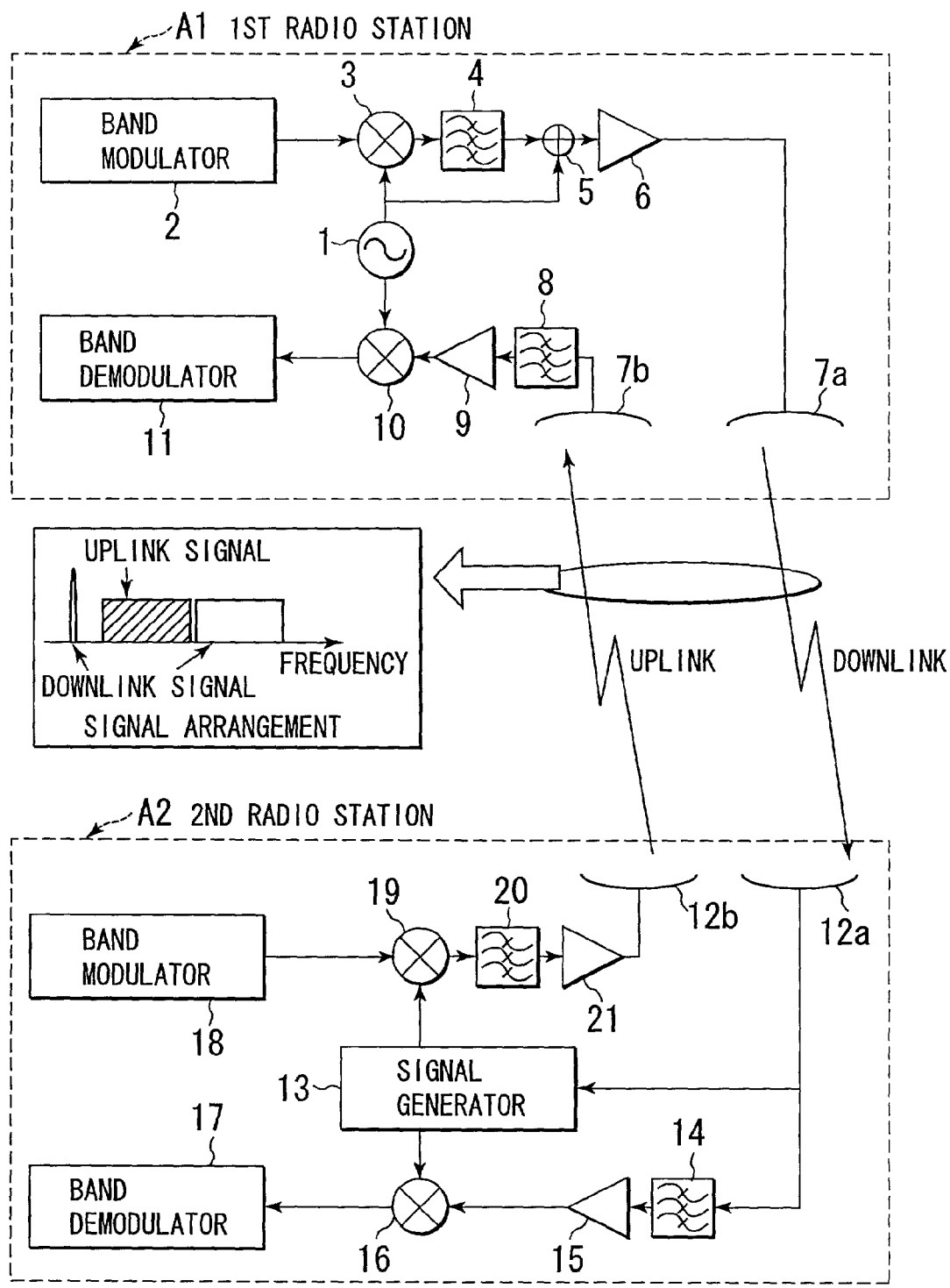
FIG. 1 is a schematic diagram of a two-way radio communication system that is a first embodiment of the present invention.

FIG. 1 shows a two-way radio communication system that is a first embodiment of this invention for two-way radio communication. In this example, the two-way communication takes place between a first radio station A1 and a second radio station A2. The first radio station A1 has a local oscillation signal source for frequency-converting a modulated intermediate frequency band signal to a transmission radio frequency and is also used for converting a received radio signal to an intermediate frequency band. The second radio station extracts and regenerates the component of the local oscillation signal transmitted by the first radio station, frequency-converts the regenerated oscillation signal component to a modulated intermediate radio frequency band signal for transmission, and is also used to convert a received radio signal to an intermediate frequency band. This means that providing either one of the radio stations with a local oscillator eliminates the need to provide the other radio station with a local oscillator.

The first radio station A1 (the parent station) has a local oscillator 1. In this system, a modulated signal is up-converted to a radio frequency band by using a multiplier 3 to multiply an intermediate frequency band modulated signal output by an intermediate frequency band modulator 2 at an intermediate frequency band that is lower than the radio frequency, and a local oscillation signal produced by the local oscillator 1. The modulated transmission signal thus produced is passed through a band-pass filter 4 to remove unnecessary components, after which a local oscillation signal is added by an adder 5 and the resulting signal is amplified by an amplifier 6 and transmitted from a transmitting antenna 7a.

The first radio station A1 also receives, via receiving antenna 7b, radio signals from the second radio station A2.

Each radio signal thus received is passed through a band-pass filter 8 to remove unnecessary components and the resulting signal is amplified by an amplifier 9 and is then down-converted to an intermediate frequency band by the multiplier 10 multiplying the signal with a local oscillation signal from the local oscillator 1. The resulting intermediate frequency band modulated signal is then demodulated by an intermediate frequency band demodulator 11.

The second radio station A2 (the child station) uses the receiving antenna 12*a* to receive radio signals (which include modulated radio signal components and local oscillation signal components) from the first radio station A1. A local oscillation signal regenerator 13 is used to extract local oscillation signal components from a portion of the received signals. The local oscillation signal regenerator 13 can be implemented by a narrow band-pass filter, injection-locked oscillator or RF amplifier or the like.

The local oscillation signal regenerated by the local oscillation signal regenerator 13 is multiplied by the multiplier 16 with the received signal that has passed through band-pass filter 14 and amplifier 15, whereby the unmodulated component of the received signal is down-converted to an intermediate frequency band and demodulated by intermediate frequency band demodulator 17.

In the second radio station A2, a modulated signal is up-converted to a radio frequency band by using a multiplier 19 to multiply an intermediate frequency band modulated signal output by an intermediate frequency band modulator 18 at an intermediate frequency band that is lower than the radio frequency, and a local oscillation signal produced by the local oscillation signal regenerator 13. After being passed through a band-pass filter 20 and an amplifier 21, the resulting signal is transmitted from the transmitting antenna 12*b*.

Because the above-described two-way radio communication system configuration is equivalent to each of the first and second radio stations A1 and A2 having a local oscillation signal source that is frequency- and phase-locked, the local oscillation signal is not susceptible to degradation by phase noise contained in the local oscillator, or to the effect of frequency offset. This enables high-quality communications and, since there is no need to use a costly, high-quality local oscillator, a low-cost two-way radio communication system can be achieved.

Figure 2:
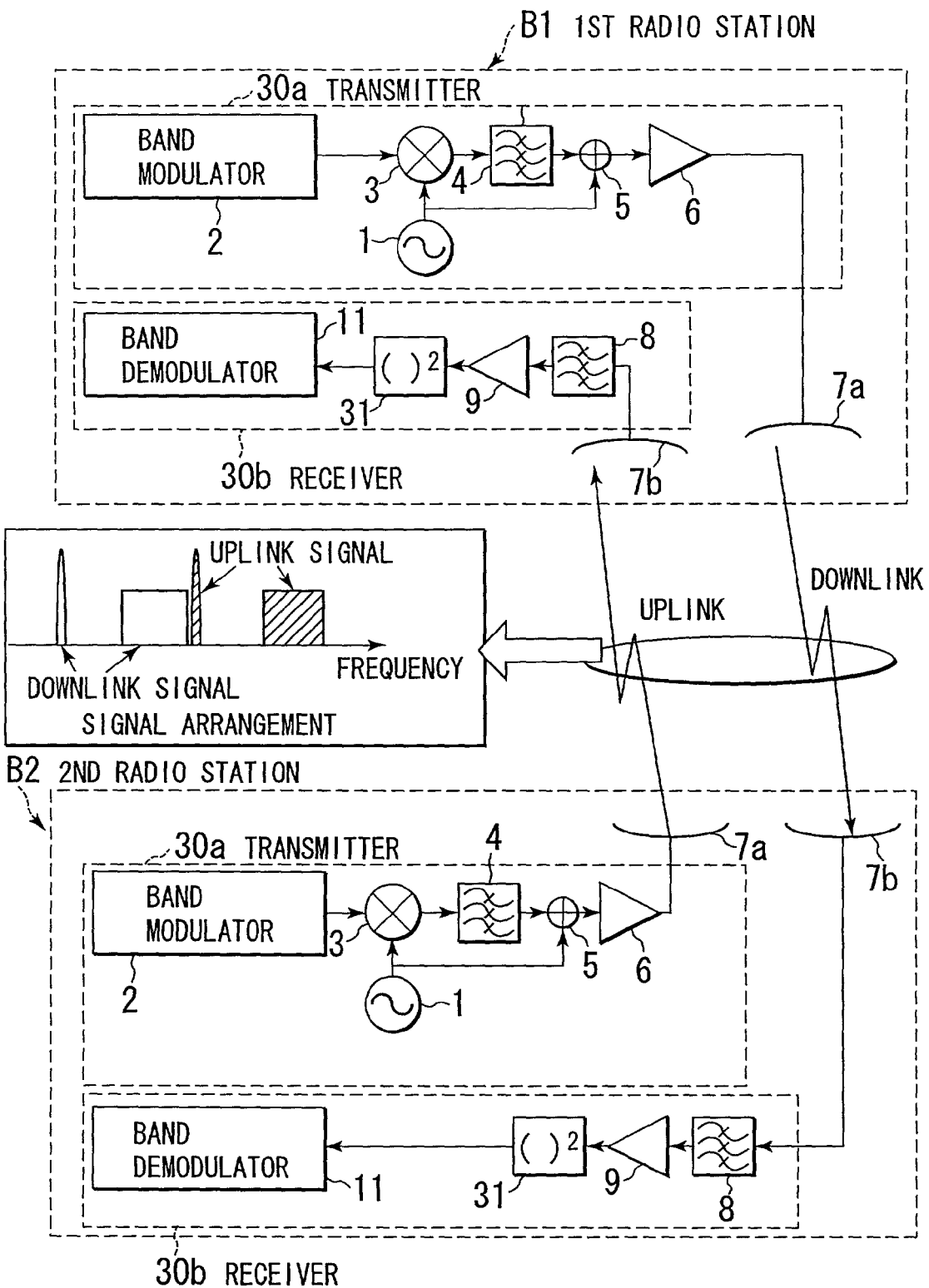
FIG. 2 is a schematic diagram of a two-way radio communication system that is a second embodiment of the invention.

FIG. 2 shows a two-way radio communication system that is a second embodiment of this invention for two-way radio communication. In this example, the two-way communication takes place between a first radio station B1 and a second radio station B2, each of which has a local oscillator. This allows each of the radio stations to use a local oscillation signal to up-convert a modulated intermediate radio frequency band signal to a transmission radio frequency band. Also, when obtained modulated signals and local oscillation signals are being simultaneously transmitted and received by each station, the stations can generate intermediate frequency band modulated signals by producing multiplication components from received radio signals that include a modulated radio frequency band component and a local oscillation component. That is, the two radio stations engaged in two-way communication each uses its own local oscillation signal only when transmitting, not when receiving, so it is not necessary to equip both stations with frequency- and phase-locked local oscillators.

In this embodiment each of the first and second stations B1 and B2 is provided with its own transmitter 30*a* and receiver 30*b*. The following explanation is therefore made with reference only to the configuration of the first radio station B1.

The first radio station B1 transmitter 30*a* comprises a local oscillator 1 for outputting a local oscillation signal, an intermediate frequency band modulator 2 for modulating a signal and outputting it as a modulated intermediate frequency band signal at an intermediate frequency band that is lower than the radio frequency, a multiplier 3 for multiplying the modulated intermediate frequency band signal and the local oscillation signal and up-converting the modulated signal to a modulated radio frequency band signal. After a band-pass filter 4 has removed unnecessary components included in the modulated radio signal, an adder 5 adds the modulated radio signal and the local oscillation signal. The resulting signal is then amplified by an amplifier 6 and transmitted from the transmitting antenna 7*a*.

The first radio station B1 receiver 30*b* comprises a receiving antenna 7*b* for receiving the radio signal from the second radio station B2. After a band-pass filter 8 has removed unnecessary components included in the radio signal, the signal is amplified by an amplifier 9. Following this, the radio signal is down-converted to the intermediate frequency band by using a squarer 31 (comprised using an amplifier or other such device having a non-linear effect) or the like to obtain the multiplication component of the radio signal from the station B2 and the local oscillation signal component. This modulated intermediate frequency band signal is demodulated by intermediate frequency band demodulator 11.

In accordance with the two-way radio communication system using the first and second radio stations B1 and B2, when one station receives a signal from the other station, the signal is down-converted to the intermediate frequency band by generating the multiplication component of the modulated radio signal component and local oscillation component of the received signal. Since there is therefore no need to provide the local oscillator used by each radio station with frequency- and phase-locking, it is possible to achieve a two-way radio communication system at a lower cost. In the configuration of the second embodiment, the first and second radio stations B1 and B2 are set to use different transmission frequency bands, to form a frequency-division demodulation system.

Figure 3:
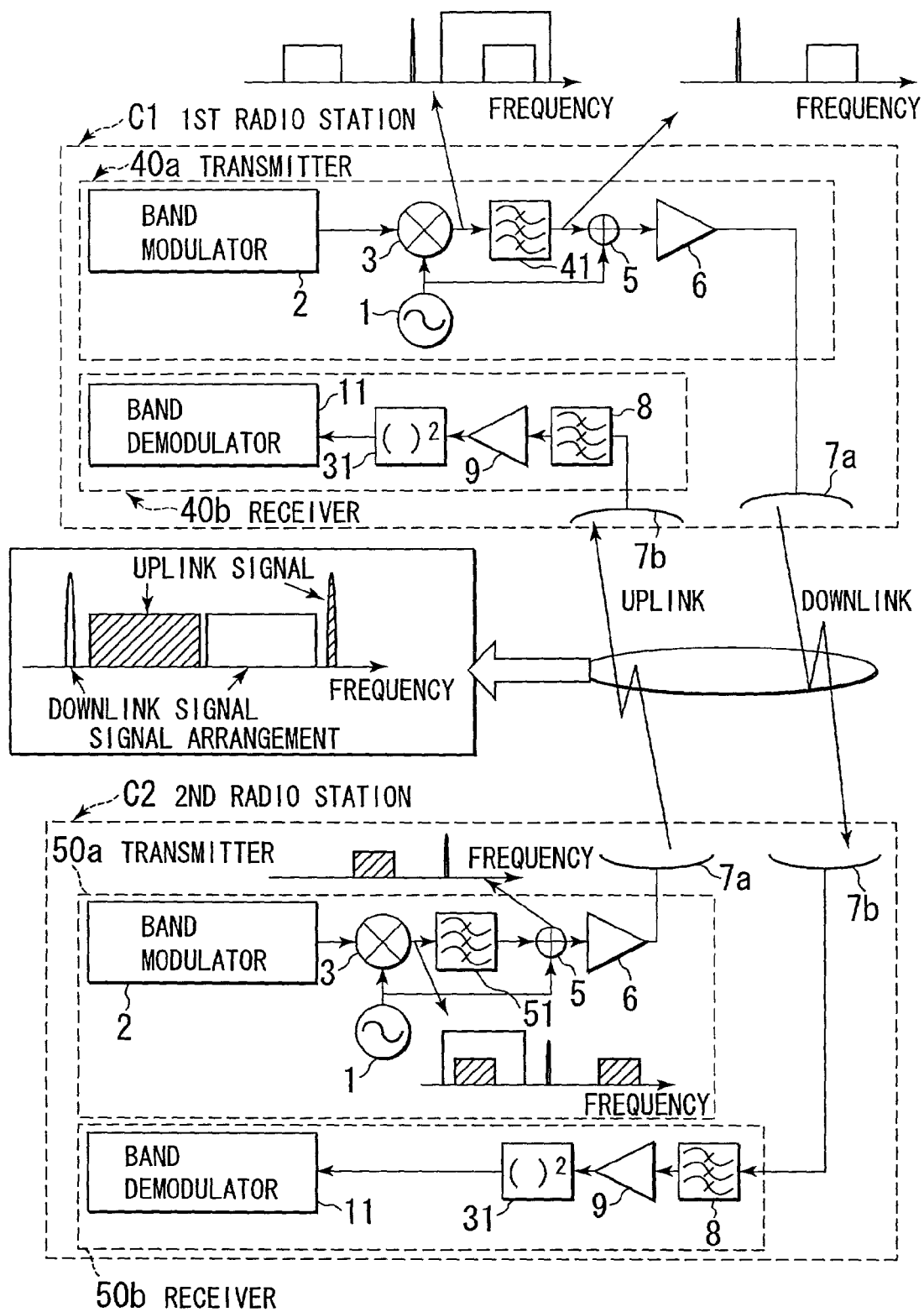
FIG. 3 is a schematic diagram of a two-way radio communication system that is a third embodiment of the invention.

FIG. 3 shows a two-way radio communication system that is a third embodiment of this invention for two-way radio communication. In this example, two-way communication is effected between a first radio station C1 and a second radio station C2. In this embodiment, the first radio station C1 selects and transmits an upper-side-band radio signal generated by frequency-conversion, and the second radio station C2 uses a local oscillation signal having a different (for example higher) frequency than that of the local oscillation of the first radio station C1 to transmit a lower-side-band radio signal generated by frequency-conversion. This makes it possible to efficiently utilize the frequency bands employed by the uplink and downlink signals. As in the second embodiment, an advantage of the configuration is that the two radio stations engaged in two-way communication each uses its own local oscillation signal only when transmitting, not when receiving, so it is not necessary to equip both stations with frequency- and phase-locked local oscillators.

The first radio station C1 transmitter 40*a* comprises a local oscillator 1 for outputting a local oscillation signal, an intermediate frequency band modulator 2 for modulating a signal and outputting it as a modulated intermediate frequency band signal at an intermediate frequency band that is lower than the radio frequency, a multiplier 3 for multiplying the modulated intermediate frequency band signal and the local oscillation signal and up-converting the modulated signal to a modulated radio frequency band signal.

Of the sideband signals generated in the conversion of the modulated intermediate frequency band signal to the radio frequency band by the intermediate frequency band modulator 2, local oscillator 1 and multiplier 3, only an upper-side-band signal passes through band-pass filter 41, and the local oscillation signal is added to the upper-side-band signal by the adder 5. The resulting signal is then amplified by an amplifier 6 and transmitted from the transmitting antenna 7*a*.

The transmitter 50*a* of the second radio station C2 (child station) comprises a local oscillator 1 for outputting a local oscillation signal, an intermediate frequency band modulator 2 for modulating a signal and outputting it as a modulated intermediate frequency band signal at an intermediate frequency band that is lower than the radio frequency, a multiplier 3 for multiplying the modulated intermediate frequency band signal and the local oscillation signal and up-converting the modulated signal to a modulated radio frequency band signal.

Of the sideband signals generated in the conversion of the modulated intermediate frequency band signal to the radio frequency band by the intermediate frequency band modulator 2, local oscillator 1 and multiplier 3, only a lower-side-band signal passes through band-pass filter 51, and the local oscillation signal is added to the lower-side-band signal by the adder 5. The resulting signal is then amplified by an amplifier 6 and transmitted from the transmitting antenna 7*a*.

As described, the first radio station C1 receiver 40*b* uses a receiving antenna 7*b* to receive the radio signal from the second radio station C2. After band-pass filter 8 has removed unnecessary components included in the radio signal, the signal is amplified by an amplifier 9. Following this, the radio signal is down-converted to the intermediate frequency band by using a squarer 31 (comprised using an amplifier or other such device having a non-linear effect) or the like to obtain the multiplication component of the radio signal from the second radio station C2 and the local oscillation signal component. The modulated intermediate frequency band signal is demodulated by the intermediate frequency band demodulator 11.

In the same way, a radio signal transmitted by the first radio station C1 is received by the C2 receiver 50*b* via receiving antenna 7*b*. After band-pass filter 8 has removed unnecessary components included in the radio signal, the signal is amplified by the amplifier 9. Following this, the radio signal is down-converted to the intermediate frequency band by using a squarer 31 (comprised using an amplifier or other such device having a non-linear effect) or the like to obtain the multiplication component of the radio signal from the second radio station C2 and the local oscillation signal component. The modulated intermediate frequency band signal is demodulated by the intermediate frequency band demodulator 11.

In accordance with the above two-way radio communication method using the first and second radio stations C1 and C2, when one station receives a signal from the other station, the signal is down-converted to the intermediate frequency band by generating the multiplication component of the upper-side-band or lower-side-band signal component and local oscillation component of the received signal. Since there is therefore no need to provide the local oscillator used by each radio station with frequency- and phase-locking, it is possible to achieve a two-way radio communication system at a lower cost. In the configuration of the third embodiment, the second radio station C2 uses a local oscillation frequency that is higher than that of the first radio station C1. Also, the lower-side-band signal formed following the frequency-conversion is selected as the transmitted radio signal, enabling unused frequency bands between the local oscillation frequency and the radio signal to be utilized as the frequency band of uplink signals, thereby making it possible to make effective use of frequencies.

The two-way radio communication system and method described above provide very high quality two-way radio transmission, since signal phase noise and frequency offset can be canceled out. Moreover, since there is no need to use a high-quality local oscillator, two-way radio communication can be achieved at low cost. In addition, in accordance with the system and method described above, unused frequency bands between the transmitted modulated intermediate band signal and local oscillation frequency can be utilized, making it possible to make efficient use of frequency bands, resulting in lower-cost, high-quality two-way communication.

What is claimed is:

1. A two-way radio communication system for two-way communication between first and second radio stations, the two-way radio communication system comprising:
    a first radio station equipped with a signal modulator for generating a modulated signal in an intermediate frequency band that is lower than a radio frequency;
    a modulated transmission signal generator that produces a modulated radio transmission signal by using a local oscillation signal to up-convert the modulated signal to a radio frequency band;
    a transmitter that transmits the local oscillation signal used by the modulated transmission signal generator together with the modulated radio transmission signal as a radio signal; and
    a receiver that receives a radio signal from a second radio station and down-converts the received signal to a modulated frequency band by using the local oscillation signal utilized for up-conversion by the modulated transmission signal generator;
    a second radio station equipped with a local oscillation signal regenerator for extracting and regenerating just a local oscillation component from among signal components received from the first radio station;
    a receiver that uses a local oscillation signal regenerated by the local oscillation signal regenerator to down-convert a received modulated radio signal to an intermediate frequency band;
    a signal modulator for producing a modulated signal in an intermediate frequency band that is lower than a radio frequency; and
    a transmitter that uses the local oscillation signal regenerated by the local oscillation signal regenerator to up-convert to a radio frequency band a modulated signal produced by the signal modulator.

2. A two-way radio communication method for conducting two-way communication between first and second radio stations, the two-way radio communication method comprising:
    a first radio station that transmits a radio signal to a second radio station by generating a modulated signal in an intermediate frequency band that is lower than a radio frequency, producing a modulated radio transmission signal, using a local oscillation signal to up-convert the modulated signal to a radio frequency band and transmitting the local oscillation signal used by the modulated radio transmission signal with the modulated radio transmission signal as a radio signal; and when receiving a radio signal from the second radio station, down-converts the received signal to a modulated frequency band by using the local oscillation signal utilized for up-conversion; and a second radio station that extracts and regenerates local oscillation components from among signal components received from the first radio station, uses a local oscillation signal thus regenerated to down-convert a received modulated radio signal to an intermediate frequency band and, when transmitting a radio signal to the first radio station, produces a modulated signal in an intermediate frequency band that is lower than a radio frequency, and uses the regenerated local oscillation signal to up-convert to a radio frequency band a modulated signal produced by the signal modulator.

* * * * *